(12) United States Patent
Linden et al.

(10) Patent No.: US 7,001,519 B2
(45) Date of Patent: Feb. 21, 2006

(54) INTEGRATED CLOSED LOOP SYSTEM FOR INDUSTRIAL WATER PURIFICATION

(75) Inventors: Bjorn Linden, Göteborg (SE); Torsten Wik, Gothenburg (SE)

(73) Assignee: Greenfish AB, Kungalv (SE)

( * ) Notice: Subject to any disclaimer, the term of this patent is extended or adjusted under 35 U.S.C. 154(b) by 0 days.

(21) Appl. No.: 10/914,489

(22) Filed: Aug. 9, 2004

(65) Prior Publication Data

US 2005/0061737 A1   Mar. 24, 2005

Related U.S. Application Data

(63) Continuation of application No. PCT/SE03/00198, filed on Feb. 5, 2003.

(30) Foreign Application Priority Data

Feb. 7, 2002   (SE) .................................... 0200348

(51) Int. Cl.
*A01K 63/04*   (2006.01)
*C02F 3/30*   (2006.01)

(52) U.S. Cl. ...................... 210/602; 210/605; 210/615; 210/631; 210/151; 210/169; 210/259; 210/903; 210/906; 210/908; 119/227

(58) Field of Classification Search ............... 210/602, 210/605, 615–617, 620–621, 630, 150, 151, 210/169, 252, 259, 416.1, 416.2, 903, 906, 210/908, 631; 119/227, 260
See application file for complete search history.

(56) References Cited

U.S. PATENT DOCUMENTS

| | | | |
|---|---|---|---|
| 5,380,438 A | | 1/1995 | Nungesser |
| 5,514,277 A | * | 5/1996 | Khudenko ................... 210/603 |
| 5,578,200 A | * | 11/1996 | Funakoshi et al. .......... 210/134 |
| 6,555,002 B1 | * | 4/2003 | Garcia et al. ............... 210/605 |

FOREIGN PATENT DOCUMENTS

| | | |
|---|---|---|
| DE | 3827716 A1 | 8/1988 |
| WO | WO 97/49279 | 12/1997 |

* cited by examiner

*Primary Examiner*—Fred G. Prince
(74) *Attorney, Agent, or Firm*—Gauthier & Connors LLP

(57) ABSTRACT

The present invention relates to an integrated closed loop system for aquaculture in at least one culturing tank and using continuous bioreactor technology for the biological treatment and removal of organic material, nitrogen and phosphorous, comprising: an integrated, partially or wholly closed loop system for waste water treatment, where the water contains nitrogen containing compounds and/or substances, comprising at least one production unit of such nitrogen containing compounds and/or substances and using continuous bioreactor technology for the biological treatment and removal of organic matter, nitrogen and phosphorous from the said water at continuous flow, comprising: a) at least one suspended carrier bioreactor for bacterial growth under anoxic conditions to cause anaerobic denitrification, with one or several compartments, preceding b) at least one suspended-carrier bioreactor for bacterial growth under oxic conditions to cause aerobic nitrification, c) the denitrification taking place after the production unit, and d) the nitrification taking place prior to the production unit in a by-pass mode as part of the continuous flow.

44 Claims, 3 Drawing Sheets

INTEGRATED CLOSED LOOP SYSTEM FOR INDUSTRIAL WATER PURIFICATION

This application is a continuation of International Patent Application No. PCT/SEQ3/00198, filed Feb. 5, 2003, which claims priority to Swedish Patent Application No. 0200348-1, filed Feb. 7, 2002, both of which are incorporated herein by reference in their entirety.

FIELD OF THE INVENTION

The invention relates to an integrated closed loop system, or a partially closed loop system, for water purification, comprising a sequenced bioreactor system for the biological processing of nitrogen and phosphorous containing waste water from a production process.

BACKGROUND OF THE INVENTION

The release of nitrogen and phosphorous compounds into the environment has become one of the most pressing environmental hazards. The release is generally of no significance in low concentrations due to natural presence. However, they are released in large quantities especially in industrial, domesticated farm, aquaculture or forestry agriculture areas and cause eutrophication of water recipients, first producing algal blooms and thereafter oxygen deficiency in natural waters.

Stringent requirements on the processing of biologically produced nutrients and materials are one of the limiting constraints for the establishment of new industrial, food processing, agro- and aquaculture ventures. This is especially true in parts of Scandinavia, and also around the Mediterranean, mid Europe, the US and Canada, parts in Oceania, South East Asia, and several developing countries.

This invention focuses on removal of BOD (biological oxygen demand), nitrogen and phosphorous by biological means. Numerous biological treatment processes have been developed which typically use single or double reactors comprising autotrophic (ammonia and nitrite oxidation) and heterotrophic (aerobic organic oxidation and anoxic denitrification) processes. They are often of a single activated sludge type or fixed bed type, using organic matter in the influent for the removal of nitrogen or/and phosphate (e.g. WO 96/04784, U.S. Pat No. 3,871,999).

The use of activated sludge is cost efficient in large urban waste water treatment plants. However, activated sludge is difficult to control (as in high intensive aquaculture systems with high rates of recirculation and water flow), due to a necessary aggregation into flocs with a subsequent floatation or sedimentation, which are all difficult to control. It puts requirements on large sedimentation or flotation tanks, which in turn lowers the cost efficiency (U.S. Pat. No. 3,849,303, U.S. Pat. No. 5,611,927).

Some of the patented innovations in this field are made up of systems that change the cycles of purification in one or more reactors over time, sometimes called sequenced batch reactor technique (U.S. Pat. No. 4,188,289, U.S. Pat. No. 4,948,510). This means that the microorganisms are subjected to different forms of stress that will lead to loss of growth yield and efficiency of the filters or reactors, due to constraints of metabolic reversals in each cycle and inter-species competition.

Other disclosures use fixed bed bioreactors. Fixed bed reactors for purification as well as any reactor where most of the active biomass is attached as a biological film on an immobilized media, are subject to problems with clogging and requirement of back flushing of the filter media (U.S. Pat. No. 5,081,954). Such back flushing removes the biofilm or parts of the biofilm, creating a lag phase for the regeneration of full capacity of the filter. Furthermore, the uniform distribution of nutrients, oxygen, and carbon through the filter is very difficult to control in fixed bed reactors, where a uniform distribution is actually a prerequisite for an effective process. Numerous examples on patents disclose solutions for an even distribution of water flow in a fixed bed filter, but in practice, it is impossible to fully control the even distribution of bacteria, substrate and electron acceptors as oxygen or nitrate in the media. More importantly, these constraints impair the means of reliable industrial control and optimisation. Fluidised sand bed reactors or sand or fluidised bead filters are used to a large extent in the US (e.g. U.S. Pat. No. 5,792,386). They claim high removal rates of BOD and nitrogen. However, the energy input in these systems is relatively high since they are driven by high-pressure pumps, whereby cost efficiency is lost compared to low head systems, although high pressure systems require small footprint area relative to the internal specific filtration area.

In addition, in flow through systems like waste water treatment plants, where almost all influent inorganic nitrogen is in the form of ammonium, the water has to be nitrified (ammonium is oxidized to nitrite and nitrate) before It is denitrified (nitrite and nitrate is reduced to nitrogen gas). In post denitrification systems the denitrification process is therefore placed after nitrification reactors (U.S. Pat. No. 3,849,303, U.S. Pat. No. 5,611,927). The denitrification requires an easily biodegradable organic substrate while the nitrifying autotrophic bacteria on the other hand, require very low concentrations of biodegradable organic substrate to be able to compete with the heterotrophic bacteria. Therefore, such systems will fail in either the nitrification process or In the denitrification process if not a nearly complete degradation of organic matter precedes the nitrification and an easily biodegradable hydrocarbon is added to the denitrification process.

Alternatively, one may use predenitrification where the denitrification is put as the first reactor constituent in the system (counted from the waste producing process), e.g. an activated sludge plant, and the treated waste water is recirculated back to the denitrification reactor from a subsequent nitrification reactor after the water has been nitrified. In this way the organic matter to be removed is used for the denitrification process as well. However, hydraulic limitations of each subprocess in the loop limit the recycle and therefore limit the maximum nitrogen removal.

In a closed loop system, where only a small part of the water is exchanged with the surrounding environment, the oxidation of organic matter before the denitrification process, like in conventional systems and patent disclosures (WO 96/04784), poses a reduction In the efficiency of biological water treatment, because available organic material that is desirable for the denitrification is lost in the initial oxidation process. High efficiency in the nutrient and organic removal is achieved by organising the biological processes in the energetically and biochemically most efficient sequence. In such a system the natural biodegradable carbon in the production process effluent is used optimally if the denitrification process precedes a heterotrophic oxidation before nitrification, like in the present invention.

It is the sequence of the biological treatment processes relative to the production unit and the inflexibility of the chosen structures that are the major limitations in disclosures for water purification. WO 97/49279 discloses one example where the denitrification is placed in a recycle after the nitrification, and hence there will be no or only limited denitrification if an externally added carbon source is not added. Further, the hydraulic load on the entire treatment process will be unnecessarily high. In another embodiment in the same patent, where the sequence could be argued to be correct (first a denitrification process with a by-pass, followed by a carbon filter and nitrification) the inflexibility of not having a by-pass over the nitrification process will imply a very inefficient use of the nitrification reactor If the nitrite levels are not to become dangerously high to many aquatic organisms. Further, the nitrification process is pursued in a 4" gravel bed that has the obvious large footprint disadvantage when run in high intensive systems. In WO 96/04784 the nitrification is placed first, which will imply that there will be almost no nitrification as long as there are biodegradable organic matter in the effluent of the production process (fish). The placement of the denitrification process after the nitrification implies as argued that an external carbon source has to be added as well.

The greatest challenge of all in biological water purification processes is developing environments for high efficiency of the nitrification process, which is far more sensitive than denitrification and BOD-removal. Inefficient nitrification leads to the production of nitrite, which may be a great hazard in agro-/industrial processes and especially if marine or freshwater animals are produced within the industrial system. Due to the slow growth rates of the nitrifying bacteria, these organisms will always be in the "underdog" position to other heterotrophic organisms. The main reason for this is that the nitrifying bacteria applies the highly energy requiring process of carbon dioxide fixation by the Calvin cycle, whereas heterotrophs utilise available organic carbon in solution for its anabolism. This main metabolic constraint is followed by the further outlined growth limitations of this organism, which is not recognized in patent WO 97/49279.

1. One of the most limiting factors is the need for oxygen for nitrification. In complete nitrification 1 g of ammonia requires 4.25–4.33 grams of molecular oxygen. A rather low concentration of ammonia of 4 mg/l, thus requires an oxygen concentration of 17 mg/l, for nitrification to be complete. This oxygen concentration is not even present at water temperatures as low as 0° C., where oxygen is present at 14.6 mg/l in fresh water at normal ambient oxygen partial pressure. At normal process temperatures around 20° C., as in many indoor industrial processes, water oxygen concentrations will not exceed 9 mg/l, at which nitrification will be incomplete at ammonia concentrations above 2.65 mg/l. To achieve complete nitrification at high ammonium concentrations oxygen has to be dissolved in the water, either by explicitly adding (aeration or liquid oxygen/air) or passively by having a large contact area to the air as in trickling filters, for example.
2. Low ammonia concentrations, lower than 4 mg/l will lead to reduced nitrification rates because the Michaelis-Menten half saturation constant, which is 1–3 mgN—$NH_4$/l, causes sub-maximum nitrification rates below levels of 4 mg ammonia/l water. Thus, in systems with low ammonia concentrations, nitrification rates are always sub optimal. Low ammonia concentrations, around 1–2 mg/l, where the need for oxygen is low, thus lead to the concomitant reduction of the nitrification rate to 25–50% of its maximum capacity with a corresponding decrease in growth.
3. As long as there is moderate concentrations of biodegradable organic matter in the water, the growth of heterotrophs by far outcompete the autotrophic nitrifying bacteria. In the present invention this problem is over come by placing the nitrification in a by-pass mode outside the main water stream, to create a highly specialized environment for the nitrifying bacteria.
4. High flow rates of water through nitrification reactor usually mean incomplete nitrification. Due to low residence time the nitrite oxidizing bacteria will not be able to oxidize all nitrite into nitrate. This is especially true in systems where high flow rates of water are applied and ammonia levels exceeding 4mg/l As a result toxic nitrite is accumulated in the system.

In summary
1. In natural conditions, oxygen levels are usually to low for nitrification to be complete, even at very low water temperatures with high oxygen solubility.
2. When ammonia levels are low, lower than 2–3 mg/l oxygen may not be limiting, but then instead, the nitrification rate becomes reduced.
3. In the main water stream the nitrifying bacteria are easily out-competed by heterotrophs, due to high organic load.
4. At high water flows incomplete nitrification will be the result from the slow growth rate of the nitrite oxidizing bacteria, compared to the water flow rate.
5. Thus in most cases either oxygen concentration or ammonia concentration is-too low, or BOD content or water flow is too high. In most cases one of these four situations are predominant in the main stream of most continuously operating water purification systems. They all result in incomplete nitrification. In WO 97/49279 the inventors themselves have provided the evidence of incomplete nitrification with reported nitrite levels as high as 15–50 mg nitrite/l for several weeks. At such levels most fish species would perish (rainbow trout has $LC_{50}$ values at 0.03–0.06 mg/l). This is nowhere better displayed In WO 97/49279 , than when the nitrite levels indeed drop abruptly and are reduced to a minimum with the concomitant application of denitrification in the purification process. Thus, it is clear that the patent WO 97/49279 has hampered the nitrification capacity in at least one of the previous four conditions mentioned above.

Other similar systems, such as DE 38 27 716, have positioned the water purification bioreactors out of the mainstream water flow. In this case denitrification is placed before nitrification. This has the advantage of consuming BOD In the denitrification process before nitrification is applied. But still, water flow leading to the nitrification reactor will contain high amounts of organic material that will hamper nitrification, since no BOD-oxidising reactors are positioned in-between these two processes. Also, the water flow rate leading to the denitrification reactor can support denitrification at water flow rates far exceeding the reaction rates of the nitrifying bacteria. In addition, the purified water is funnelled back to a collection tank and being mixed with incoming non-purified water. Naturally, it should be considered a bad management practice to mix non-purified water with newly purified. In addition, the bioreactor media is are fixed beds in both cases, which contain the limitations, described earlier.

Regarding disclosures of biological phosphorous removal, U.S. Pat. No. 5,380,438 discloses processing of phosphorous containing water in anoxic and anaerobic conditions before applying aerobic phosphorous removal and nitrification in an activated sludge process. This invention has the limitation of applying nitrification in the same reactor as biological phosphorous removal. It requires competition of PAO (Phosphate Accumulating Organisms) with the nitrifying bacteria in the same reactor. It is well known that any aerobic ammonia containing sludge will develop nitrification in temperatures and pH applicable to phosphorus removal. Thus, nitrification bacteria will compete with the PAO in this type of reactor. Further, the nitrification produces nitrate that is known to inhibit the PAO process and, thus, this system is inherently sub-optimal.

Another phosphorous removal concept makes use of cyclical discharge of activated sludge or mixed liquor to three different basins to obtain anaerobic and aerobic PAO conditions. The process of U.S. Pat. No. 4,948,510 does distinguish between anaerobic and aerobic conditions. Furthermore, the competition between nitrifying bacterial and PAO accumulation in the aerobic tank is admitted, as well as the competition between heterotrophic carbon use and PAO carbon uptake, which are simultaneously applied. To solve the problems of competing nitrifying bacteria this Invention applies a rather complicated 6 (six) cycle system in three different basins. The three limitations with this system are:
1. The sludge is always more difficult to control than biofilm processes on suspended carriers, especially in combination with aerobic anaerobic processes.
2. The sludge is containing all the microorganisms, nitrifiers, denitrifiers, aerobic heterotrophs and PAOs at the same time, exposing them to cyclic changes and differential metabolic lag phases in the six purification cycles.
3. The microorganisms are forced to compete for the same space, and at times, same organic material.

Regarding greenhouse cultivation of plants, one invention defines the cultivation of water living animals with photosynthesising water living plants (WO 83/03333). The water living plants are living "on land" and are moisturised by water film according to the specification. Specifically, the disclosure points out that the water is purified by consuming the nitrogen and phosphorous therein. It is known from such trials, for instance in applying plants for water purification In aquaculture, that a plant water purification area of at least 70% of the total production plant area is needed. Thus, such a system is not efficient for the water purification itself without extensive additional water purification, unless of course the cultured plants are the main production objective and the other industrial production units are regarded as by-products (e.g. fish).

High rate closed loop industrial systems or systems for food processing, agro- or aquaculture production, with internal processing of BOD, nitrogen and phosphorous need to be cost efficient, reliable for control, and easy to operate, with high turn over rates for waste in the industrial water treatment. This is not easily obtained with activated sludge or high-pressure systems (U.S. Pat. No. 4,948,510). Among others, high-pressure systems excerpt an exceeding bioerosion compared to low-pressure systems. Furthermore, high-pressure systems also require above average capital investments.

The present invention is the starting point for an era of low energy, continuous reactor and bioreactor system with large filter area and high cost efficiency. It is a system for the biological purification of BOD, nitrogen and phosphorous for closed loop industrial systems.

SUMMARY AND OBJECTS OF THE INVENTION

The innovation provides an integrated and complete processing system for Industrial and agricultural waste water; reducing the concentration of BOD or organic materials; reducing the concentration of inorganic and organic nitrogen; and-reducing the concentration of organic and Inorganic phosphorous compounds by biological processes. The system is founded on a sequence of bioreactors in a continuous flow mode, with variations on the phosphorous elimination process and optional by-pass systems for nitrogen-, phosphorous- and BOD removal. The continuous mainstream design In the closed loop represents a water system with the possibility for complete or near complete purification of water from the industrial production through filters and bioreactors before water exchange is made with the surrounding environment. The array of sequenced bioreactors provides constant or nearly constant environments in the bioreactors, also producing highly controllable conditions for the microorganisms and thus for industrial optimisation.

DESCRIPTION OF THE PRESENT INVENTION

Rather surprisingly, with the present invention It has been found possible to meet the highly set demands on water quality in some industrial processes and cultured species in agri- or aquaculture. The invention is characterized by an integrated, partially or wholly closed loop system for waste water treatment, where the water contains nitrogen containing compounds and/or substances, comprising at least one production unit of such nitrogen containing compounds and/or substances and using continuous bioreactor technology for the biological treatment and removal of organic matter, nitrogen and phosphorous from the said water at continuous flow, comprising:
  a) at least one suspended carrier bioreactor for bacterial growth under anoxic conditions to cause anaerobic denitrification, with one or several compartments, preceding
  b) at least one suspended carrier bioreactor for bacterial growth under oxic conditions to cause aerobic nitrification,
  c) the denitrification taking place after the production unit, and
  d) the nitrification taking place prior to the production unit in a by-pass mode as part of the continuous flow.

A preferred embodiment of the invention encompasses that part of the continuous flow is allowed to pass both the denitrification and the nitrification in a by-pass mode.

A preferred embodiment of the invention encompasses that one or more oxygen consumption reactors precede the denitrification reactor, arranged to generate anoxic conditions for denitrification.

A further preferred embodiment of the invention encompasses that one or more particulate removal devices are arranged to generate partially or substantially particulate free water in different parts of the system.

A further preferred embodiment of the invention encompasses that the particulate removal device is selected from the group consisting of screens, swirl separators, sand filters, drum filters, sedimentation tanks, lamella separation filters, preferably the particulate removal includes foaming and foam separating devices and skimmers, for removal of foam or surface related compounds, as fats-, carbohydrate- and protein-like substances, and separate organic material from the water.

A further preferred embodiment the organic material separated at the particulate removal system is arranged to be recycled directly to the oxygen consumption reactor, to a fermentation reactor or to the denitrification reactor.

Another preferred embodiment of the invention encompasses that one or more reactors for oxidation of BOD (biological oxidation demand) or organic material in the water are positioned in any favorable position.

Another preferred embodiment of the invention encompasses that a screen, swirl separator, sand filter, drum filter, sedimentation tank or any device for particulate removal separates organic material, by skimming or foaming devices from the water is arranged in any position in the system.

A further preferred embodiment of the invention encompasses that the organic material is arranged to be recycled directly to the oxygen consumption reactor or to the denitrification reactor.

A further preferred embodiment of the invention encompasses that the closed loop system further contains biological phosphate removal bioreactor placed after a denitrification and a nitrification reactor.

Another preferred embodiment of the invention encompasses that the closed loop system further contains at least one biological phosphate removal bioreactor containing activated sludge or suspended carrier system, is applied in any position around previously mentioned reactors, in the continuous purification line or in a by-pass system.

Another preferred embodiment of the invention encompasses that a by-pass system for a removal of phosphorous is arranged to use biological activated sludge or a suspended carrier system in multiples of anaerobic and aerobic compartment systems.

A further preferred embodiment of the invention encompasses that the activated sludge for phosphorous removal is arranged to be recycled via a sedimentation chamber and phosphorous is arranged to be expelled by means of sludge.

A further preferred embodiment of the invention encompasses that the denitrification reactor contains one or more reactors for oxygen consumption, providing anoxic conditions for the denitrification system.

Another preferred embodiment of the invention encompasses that a sedimentation tank for the final polish of water by chemical precipitation of phosphorous is placed between the system and the recipient.

Another preferred embodiment of the invention encompasses that Another preferred embodiment of the invention encompasses that a by-pass system is arranged to make possible the recycling of the water from the last stage of water purification after nitrification or biological phosphate removal, back to the denitrification reactor or up to any bioreactor in the purification process.

Another preferred embodiment of the invention encompasses that Another preferred embodiment of the invention encompasses that a sterilization unit making use of UV and/or ozone is placed as the very last constituent of the system, separating this from the environment.

Another preferred embodiment of the invention encompasses that sterilization units making use of UV and/or ozone is placed anywhere in the system.

A further preferred embodiment of the invention encompasses that Another preferred embodiment of the invention encompasses that a fermentation reactor is arranged to receive dissolved and particulate organic material from particle removal and foaming devices.

Another preferred embodiment of the invention encompasses that the organic material is arranged to become fermented to fermentation products such as acetic acid or one to four carbon carboxylic acids, aldehyds, ketones, acetone or other compounds as carbon sources for the reactors, such as methanol, ethanol, glycerol, pyruvate.

A further preferred embodiment of the-invention encompasses that Another preferred embodiment of the invention encompasses that $CO_2$ is preserved by introducing oxygen or pressurized air in a closed BOD oxidation reactor prior to the nitrification bioreactor. Another preferred embodiment of the invention encompasses that the nitrification reactor is supersaturated with $CO_2$ by omitting air-and $CO_2$ stripping.

Another preferred embodiment of the invention encompasses that biogas is arranged to be produced in the system by fermentation of waste material of the system.

Another preferred embodiment of the invention encompasses that Another preferred embodiment of the invention encompasses that oxygen is provided to the system by any type of additions, as air, molecular oxygen in gas phase or liquid phase for any of the aerobic reactors.

Another preferred embodiment of the invention encompasses that oxygen is removed from reactors by vacuum, biological respiration or by injecting an inert gas.

Another preferred embodiment of the invention encompasses that the system is built into a water conserving building, where ventilation systems recondensate evaporated water for energy and water conservation for preservation of water and energy in cold, tropical or arid areas.

A further preferred embodiment of the invention encompasses that Another preferred embodiment of the invention encompasses that energy is arranged to be preserved by use of biogas produced in the system or any other biological system in its surroundings based on waste products of the system.

Another preferred embodiment of the invention encompasses that heat is arranged to be added by heat pumps, solar radiation, thermal fissures or by external biogas production.

Another preferred embodiment of the invention encompasses that by-pass systems are arranged around all the specific reactor and separator modules in the system to make possible differential purification processes and maintenance.

Another preferred embodiment of the invention encompasses that Another preferred embodiment of the invention encompasses that artificial intelligence software programs are arranged to for the control loops-in the-steering system, using linear or dynamic programming models.

Another preferred embodiment of the invention encompasses that the control system is designed for direct operation via the Internet for control and monitoring the production optimization and results, as well as modifying control parameters and turn over rates according to specific culturing conditions in every production plant of the here specified type.

Another preferred embodiment of the invention encompasses that it is completely or partially closed with partial purification of the water body, and partial water exchange with the surrounding environment.

A further preferred embodiment of the invention encompasses that Another preferred embodiment of the invention encompasses that feeding water to plants or algae for consumption of sulphur, nitrogen and phosphorous as well as mineral salts by said aquatic plants and algae.

Another preferred embodiment of the invention encompasses that it encompasses polishing of the water using aquatic plants consuming nitrogen and phosphorous prior to the purification steps, whereby the cultivated plants which are used as feed for the species in the aquaculture or food for human use, and/or as an alternative the basins can be placed after the purification reactors to improve the water and its quality to the species in aquaculture.

Another preferred embodiment of the invention encompasses that it comprises a plant and/or algal production system being used in a green house or appropriate building in an upper, second level basin, where the depth of the basins is particularly 1 to 10 cm, but may be up to 1 m deep, i.e., the basin will have a weight of 10 to 2000 kg/m², for the deeper applications, typically 20–300 kg/m².

A further preferred embodiment of the invention encompasses Another preferred embodiment of the invention encompasses that it comprises plants or algal growth systems that filter off red and blue sunlight reducing algae growth in underlying aquaculture vessels, filtering off red and blue wavelengths in the range of 420–600 nm and 650–720 nm, particularly absorbing light in the wavelengths of 420–550and 670–720 nm.

Another preferred embodiment of the invention encompasses that it comprises plastic films for coverage of the light transfer (transmittance) through the windows of e.g. the greenhouse, filtering off red and blue wavelengths in the range of 420–600 nm and 650–720 nm, particularly absorbing light in the wavelengths of 420–550 and 670–720 nm.

Another preferred embodiment of the invention encompasses that it comprises an active sludge reactor to maximize production of aerobic activated sludge by aerobic production and consumption of an essential amount of nutrient salts and BOD before feeding water to the remaining reactors.

Another preferred embodiment of the invention encompasses that the active sludge reactor is arranged to produce a soil improver, whereby the active sludge reactor is placed by means of a by-pass arrangement where the water flow is reduced.

Another aspect of the invention encompasses any combinations of one or more organisms in agri- or aquaculture, cultured in a closed loop system.

Another preferred embodiment of this aspect encompasses any combinations of one or more organisms in accordance with above, in which at least one organism is a fish species.

Another preferred embodiment of the invention encompasses any combinations of one or more organisms in accordance with above, in which at least one organism is a shellfish species.

Another preferred embodiment of the invention encompasses any combinations of one or more organisms in accordance with above, in which at least one organism is a crustacean.

As evident from above, it is essential that denitrification, i.e., treatment of the water effluent from the production unit(-s) is carried out under anoxic conditions, before treatment under oxic or aerobic conditions, i.e. aerobic degradation of organic matter and nitrification, whereby elimination of phosphorous preferably takes place both after denitrification and nitrification bioreactors, since nitrogen compounds as ammonia and nitrate are inhibitory to phosphate accumulating organisms (PAO), ammonia inducing nitrification and nitrate being directly inhibitory. Not all water needs to be treated for nitrification, but some ammonia containing water can be by-passed directly in the mainstream water to the agricultural or industrial processes or species in aquaculture. This will lead to an increase in ammonium concentration that is relatively harmless. Thus, the level of nitrification outside the mainstream purification, i.e. nitrification taking place in mentioned by-pass loop, will need to be dimensioned to counteract an increase of the above-mentioned maximum tolerances for ammonium in the industrial system.

Elimination of particulate material from the water should preferably be carried out before denitrification, but may also occur after denitrification, depending on the composition and fractions of particulates in the effluent water from the Industrial production. In any case, particulate material is eliminated prior to any nitrification and preferably prior to the BOD oxidizing reactor.

Any by-pass flow is carried out based on the condition that concentrations of e.g. phosphorous, ammonia, nitrite and suspended solids, are limited to tolerances with regard to the industrial production system, but maximized in the bioreactor system for optimum efficiency.

The industrial process may involve nitrogen limited pulp production, processing of food industry water, as from slaughterhouses, diary, brewery, yeast, biotech, blood processing, agricultural wastes as animal sewage and so forth including aquaculture.

The term aquaculture is defined as the culture of any fish or shellfish in fresh-, brackish or marine waters, or synthetically derived salt formulas for marine water, such as culturing of rainbow trout, salmon, yellowfish, cod, sole, turbot, eel, perch, pike-perch, pike, crayfish, lobster, Norwegian lobster, prawns, shrimp, oysters, mussels among others, including tropical cultured and non-cultured species as milkfish, tilapia, tropical salmon species as *dourado* or *Colossoma,* catfish species, species of *gourami,* perch species (as e.g. *Macquaria*), *arapaima,* snooks or lanternfish, prawns as Yabby or giant tiger prawn, etc, just to mention a few. The term fish and shellfish apply particularly for food production for human use, or for research purposes, for ornamental fish and shellfish production and for production of aquaculture products for use as fish feed or shellfish feed.

In the definition of closed loop industrial production systems, all the above and similar are included, and there is considered both the complete removal of biologically generated solubles that have and may have an ecological impact and the containment of ecologically undesirable organisms in the industrial unit. These are:

1. Eutrophic substances, such as nutrient salts of nitrogen and phosphorous, which are contained and reduced or completely eliminated.
2. Oxygen consuming substances such as organic compounds that can be measured as TOC, COD and BOD, i.e. any biodegradable organic substance.
3. Pathogens such as viruses, bacteria and multicellular or acellular parasites such as fish lice, flagellates etc.
4. Genetically modified or genetically undesirable strains of different species of bacteria, fungi, plants, fish, shellfish or crustaceans present in the industrial system, eliminating genetic drift from the production unit to the surrounding ecosystem.

Loss of water due to evaporation is normally not within the definition of a closed loop system, since the loss of water vapour does not lead to environmental penalty. However, this system will also be designed for use in arid climates, thence water loss may be regarded with penalty and systems containing water from loss due to evaporation, are included in the overall plant design.

Excess salts are excreted from the species in aquaculture such as sodium, potassium, calcium, magnesium, chlorides and sulphates, etc may be released to the environment after sterilisation. The water body is renewed by an external water source or desalinated after the last steps of purification in the system. If cultivation is made in any forms, higher organisms such as parasites and cultured species are not released in the process of water exchange.

In overall considerations for phosphate, the removal efficiency may be kept low or high in the industrial system due to the fact that internal high levels of phosphate pose no direct health risk to the species in aquaculture but may pose a hazard in some industrial processes. Thus, it is possible and may even be cost efficient to arrange the phosphorous removal system as a by-pass system. However, if high levels of phosphate are kept in the system, special treatment may have to be made before expelling the water into an external recipient. Nitrogen free, but phosphate rich water may if necessary have to be recirculated through the phosphate reducing reactor several times for complete or nearly complete phosphate removal by means of a by-pass system. Alternatively or additionally, chemical means may be applied to precipitate the phosphate with salts with third valence metal ions, i.e. $FeCl_3$ or $Al_2(SO4)3$, and the phosphate salt finally eliminated from the system in any form of a sedimentation chamber. Phosphate removal from the water to be purified is enhanced by PAO by first internally accumulating organic materials under anaerobic conditions, the organic materials being particularly efficient for metabolization if they are any 1–6 carbon compounds in the form of alcohol, ketone, aldehyde, carboxylic acid forms or generally defined as VOC's (volatile organic compounds, short and biologically easily accessible carbon compounds). Secondly, in the aerobic phase, to which the anaerobic bacteria are is shifted or submitted to injected oxygen, phosphate is accumulated to high levels as inorganic phosphate (Pi) and stored in the form of polyphosphate by use of the internally stored carbon incorporated from the preceding anaerobic phase. The levels of phosphate storage are in the range of up to 20% phosphate and 80%, optimally around 50% polyphosphate dry weight of the sludge or biomass. The phosphate is ultimately removed as phosphate rich sludge from the activated sludge sedimentation chamber, or by a washing procedure from which the greater part of the activated sludge or biofilm is recycled back or submitted to the anaerobic compartment for the next purification round in a phosphate accumulation (PAO) process.

In the system the chemical and physical parameters are steered or adjusted in such a way that optimal physiological conditions are met for the industrial process or the organisms that are being cultured. This involves adjustment of parameters as pH, light, light duration, light spectrum for growth, light spectrum for growth inhibition of undesirable algae, temperature, dissolved oxygen and carbon dioxide, organic- and inorganic metabolites, salinity and buffering systems.

The system comprises an industrial production unit, growing tanks, bioreactors, screens, particulate separators, pumps, and plumbing, electrical monitoring devices with sensors, hard- and software computer controlling systems, electrically or manually operated feeding systems for the species in aquaculture and systems for feeding the microorganisms in the bioreactors with substrate for growth. The system can be made by different size and shape of the growing tanks, bioreactors, plumbing, pumps and monitoring devices, and in any material. Thus, the growth tanks and biofilters or bioreactors may be made out of plastic, concrete, steel, stainless steel, or polymeric synthetic or organic liners, sea or freshwater netcages or net pens surrounded or "bagged" by synthetic or organic liners, or free floating tanks in marine or freshwater systems, to which the present innovation of water purification, may be connected, built on adjacent floating keys, in floating buoyant tank systems or positioned and connected to a land based purification plant containing the here described innovation. The systems may be completely closed or partially closed with regard to water exchange with the surrounding marine, freshwater or estuarine system. In addition digging earthen or other ponds for the culture of species as well as for biofilters may be the basis for the closed system. Pumps may be of any number or type including low or high-pressure water pumps, centrifugal pumps, air blowers, compressors, airlift driven systems and-stirrers for gas exchange. In the process of filtering and pumping, the addition of diffuser mediated oxygen addition as well as addition of liquid oxygen or other forms of molecular oxygen, e.g. pressurized oxygen, air or ozone is included. The system may be built indoors, in industrial production units, warehouses or in greenhouses or placed in the open land terrain, in freshwater-, river-, estuarine or marine systems, according to temperature, humidity and climatologic restrictions and the industrial production units or specific requirements by the species in agri- or aquaculture.

The system is comprised by a series of bioreactors, biological filters or biofilters, the terms-used interchangeably, connected to vessels or tanks for grow-out, brood stock or weaning of aquaculture species. The system uses unpressurized fluidised bed filter systems with a moving bed or suspended carrier system for the biofilm, with variations on carrier material. In addition, a special reactor system may make use of activated sludge or suspended carriers for biological phosphorous removal, and as described, an additional activated sludge reactor may be used to reduce nutrients and BOD in the water, before or with a by-pass across the overall central purification process. The suspended biological filtration bed will be made of any free-floating material that acts as a substrate for the active biological film. Be it plastic materials of different non-defined forms, as e.g. plastic scrap material, incinerated (Leca®), zeolites, alkaline or non-alkaline sand, lava, wooden or other composite plastic/ceramic composites or carbon or polymeric chains. The bioreactor units make use of suspended carriers on which the biofilm grows (e.g. using carrier modules like e.g. Biolox, Leca, Bee-cell, Kaldnaes, Diat, Etapak, Impodan or Inter Aqua). These carriers can also be of a particular design made up of some natural and/or synthetic material (e.g. wooden, carbohydrate, any type of carbon polymer such as Teflon, epoxy, hydrocarbon or vinyl carbon products, polymeric or plastic scrap products, lava, zeolite, sand, ceramics and any composite of those mentioned). In the reactors for phosphorous removal, activated sludge or suspended carriers may be used.

The moving bed suspended carrier biological reactor system makes possible the uniform distribution of nutrients, oxygen, carbon and redox (reduction-oxidation) couples by means of the water flow and/or stirring of the water by different means such as rotators, propellers or airlifts. The system requires no chemical processing. However, as mentioned under certain conditions, e.g. phosphorous precipitation may be used as an additional method for polishing water quality, in any of the water purification stages.

In all the bioreactors, the surface area for the microorganisms to grow on, the amount and balance between carbon, the availability and quality of carbon sources, including fermented and inorganic carbon ($CO_2$), mineral nutrients (i.e. N, P, K and others), oxygen levels, are regulated for the optimum efficiency of the processes. These mentioned levels are a function of the industrial or agricultural production requirements or fish, shellfish and crustacean species, feed type and water flow that in combination produces the specific array of waste water constituents and concentrations. The specific surface area of the suspended carriers is tailor-made and thus adjusted to fit the biofilm thickness in every single compartment in the bioreactors according to specific bacterial growth conditions as specific growth rate and Michaelis-Menten kinetics of the limiting substrate. Thus, decreasing total surface area of the bioreactor suspended carrier material or basically increasing biofilm thickness by increasing incoming mass waste flow. This creates the possibility to design pocket size bioreactors with high removal fidelity with optimal use of reactor volume and footprint space.

The use of low head pumping systems, e.g. airlift pumping of water, makes low energy use possible. This also makes possible the design of relatively shallow bioreactor units and gives a large surface water area on the water table of the bioreactor in required cases. This makes possible a relatively large surface area for gas exchange, e.g. in the aerobic reactors, which typically can be used where real estate costs are low or the suspended filtration material is cheap. Anaerobic reactors, however, do not benefit from contact with air and may be made with high relative volume compared to surface area. In a special case described below, surface gas exchange or gas stripping from the water in the aerobic bioreactors is not desirable, which is the case, when $CO_2$ preservation for nitrification is required in oxygen-supersaturated water.

Sufficient residence time in the reactors is allowed to allow for sufficient bacterial growth and turn over of waste water components for desired purification to occur. These turn over rates are well accounted for by data from scientific verifications in single reactor set-ups. The levels of oxygen addition by gas exchange systems or concentrated oxygen is optimized in regard to the relative BOD, ammonium, nitrate, phosphorous and nutrient content associated with the excretion and waste production specific for the type of agro-industrial processes. The same principle is applied to adjust the level of BOD addition to create anaerobic conditions in the anoxic bioreactors.

Sufficient surface area for the microorganisms to grow on; the amount and balance between macronutrients and organic material in general; oxygen levels; and the availability and quality of carbon sources dictate turnover; flow rates; hydraulic retention times; are regulated for the optimum efficiency of the process in each and every bioreactor. The specific surface area of the suspended carriers is tailor made to fit the biofilm thickness required in every single compartment in this bioreactor, according to the amount of waste loading per unit biofilm area in the bioreactor concerned.

The precise levels of required turn over rate for the bioreactors and aquaculture system in general cannot be exactly described in any disclosure. This is due to the fact that the balance of nutrients, solids and dissolved organic materials is strongly dependent on the type of agro-/industrial process in the system, at what temperature the process or culture is run, at what grow out stage the species are present, and the type or types of feed that are used and the manufacturing methods used for production of the feed, e.g. extrusion, pelleting, drying or the use of semi moist feed. Particularly, use of feeds in agro-/industrial processes with different manufacturing methods will all lead to a different waste water balance produced in the production vessels, even if the chemical elemental composition of these feeds are equivalent. This is a consequence of the fact that these processing methods differently affect the biological availability of feed components after the processing level in mind, e.g. heating, pelleting, semi moist feeding or use of dried feed. Thus, pivotally, both the species in the agro-/industrial system or system for aquaculture and type of feed in use ultimately dictate what levels of organic and nutrient waste will be present in the water system and the distribution of the waste constituents, and thus, how to run the most efficient purification mode, turn over rate, etc, in the different bioreactors, by the control system.

The by-products from the purification system are:
1. Solid concentrated biological phosphorous sludge, which can be deployed in agriculture as fertilizer.
2. Non-eutrophic mineral salts are produced, which are sterilised before release to the environment as mineral water or retained as a mineral salt after incineration of sludge.
3. Fermented organic liquor and/or sediment is produced as a by-product from fermentation of particulate organic material, which can be used, for soil improvement or compost, or reused within the system as BOD to create anoxic conditions.
4. Activated sludge produced as a by-product from the activated sludge reactor, which sludge can be used, for soil improvement or compost, or reused within the system as BOD to create anoxic conditions.
5. A small amount of sulphuric gas in the form of hydrogen sulphide may be released to the atmosphere if not processed internally by gas washing or microbial oxidation methods for the production of sulphate.
6. Carbon dioxide ($CO_2$) is released from the respiration of the organisms in the system and biogas production (which does not add to-atmospheric $CO_2$ increase).
7. Inert dinitrogen gas ($N_2$) is released to the atmosphere, and may be released together with small amounts of nitrous oxide ($N_2O$).

Microorganisms provide the biological conversions in the water system by the processes of:
1. Heterotrophic denitrification of nitrate and nitrite, also known as respiratory denitrification or dissimilatory denitrification, (by the genera of *Achromobacter, Acinetobacter, Alcaligenes, Agrobacterium, Aquaspirillum, Azospirillum, Bacillus, Bradyrhizobium, Chromobacterium, Corynebacterium, Cytophaga, Flavobacterium, Gluconobacter, Hyphomicrobium, Kingella, Moraxella, Neisseria, Nitrosomonas, Paracoccus, Pseudomonas* (e.g. *P. aeruginosa* and *P. fluorescens*), *Rhizobium, Rhodopseudomonas, Thermothrix, Thiobacillus, Thiomicrospira, Thiosphaera, Wolinella, Xanthomonas* and the like).
2. Autotrophic oxidation of ammonia and nitrite (by the genera of *Nitrosomonas* (e.g. *Nitrosomonas europaea*), *Nitrosospira* and *Nitrobacter* (e.g. *Nitrobacter agilis*) and the like).
3. Phosphate accumulation of phosphate accumulating organisms (PAO, belonging to genera *Acinetobacter*, the proteobacteria, *Cytophaga, Flavobacterium* and the like, the high mole G+C gram positive bacteria, and specifically, bacteria identified by all variants of the EUB and HGC molecular gene probes and their linked genetical relatives).
4. Heterotrophic oxidation of organic materials (by all heterotrophic genera of bacteria and fungi including e.g. the genera *Achromobacter, Acinetobacter, Alcaligenes, Agrobacterium, Aquaspirillum, Azospirillum, Bacillus, Bradyrhizobium, Chromobacterium, Corynebacterium, Cytophaga, Flavobacterium, Gluconobacter, Hyphomicrobium, Kingella, Moraxella, Neisseria, Nitrosomonas, Paracoccus, Pseudomonas, Rhizobium, Rhodopseudomonas, Thermothrix, Thiobacillus, Thiomicrospira, Thiosphaera, Wolinella, Xanthomonas* and the like).
5. Mineralisation of nitrogen, phosphorous and other biologically/organically incorporated nutrient salts, primarily by all here mentioned heterotrophs, and finally, 6. Methanogenesis and fermentation (by the strict anaerobic methanogens, the autotrophic methanogens, the homoacetogenic bacteria, including the genera *Acetobacterium* and the Archaic methanogens by the genera of *Methanobacterium, Methanobrevibacter, Methanococcoides, Methanococcus, Methanocorpusculum, Methanoculleus, Methanogenium, Methanohalobium, Methanohalophilus, Methanolobus, Methanomicrobium, Methanoplanus, Methanopyrus, Methanosaeta, Methanosarcina, Methanosphaera, Methanosprillum, Methanothermus, Methanothrix* and the like, including fermentative microorganisms such as fungi (e.g. yeast *Saccaromyces*) and any non-pathogenic forms of bacteria like *Acetobacter, Acetobacterium, Acetivibrio, Acetoanaerobium, Acetogenium, Acetitomaculum, Bacteroides, Citrobacter, Clostridium, Deslufotomaculum,* enteric bacteria like *Escherichia, Enterobacter, Eubacterium, Gluconobacter, Klebsiella, Lactobacillus, Leuconostoc, Malonomonas, Oxalobacter, Pelobacter, Propionibacterium, Propionigenium, Proteus, Pseudomonas, Salmonella, Shigella, Sporomusa, Streptococcus, Zymomonas,* the autotrophic homoacetogenic bacteria, autotrophic sulphate reducing bacteria, acetic acid bacteria and the like) and other fermenters which produce fermentation products from particulate organic material stored in a fermentation reactor (as e.g. acetate, 2-alkyl-acetate, acetone, benzoate, 2,3-butanediol, butanol, butyrate, caproate, ethanol, formate, glycerate, glycolate, hydrogen gas, lactate, malate, methane, phosphoenolpyruvate, propionate, pyruvate, succinate, and their derivatives, or other fermentation products produced by the involvement of acetyl-CoA, propionyl-CoA, butyryl-CoA, succinyl-CoA, acetylphosphate, butrylphosphate, 1,3-bisphosphoglycerate, carbamyl phosphate, adenosine-phosphosulphate (APS), glycerol, nucleotide derivatives, all biological or synthetically derived aminoacids, their peptides or protein and protein complexes, sugars as hexoses, pentoses or riboses, and carbohydrates in general, carboxylic acids or fatty acids like lauric, myristic, palmitic, stearic, oleic, linoleic, a-linoleic fatty acids, derived in saturated or non-saturated forms in any number of carbon atoms attached to their chains in any combination, or alcohols, aldehydes, alkanes, amines, enols, ethers, ketones, thiols, and their alkylic derivatives, phenols, aromatic amines and any of the derivatives of the here mentioned substances participating in any bacterial metabolic conversion).

The fermentation products are used as a carbon source for the bioreactors and also produce methane as an additional source of energy. Thus, the system provides endogenous carbon from the waste water for denitrification and phosphate removal as well as for energy production. For full biological optimisation, external synthetic or biologically derived carbon compounds may be added (such as methanol, ethanoli molasses, acetate, butyrate, propionate, sugars, carboxylic acids, poly-β-hydroxybutyrate (PHB), or any of the fermentation products and their derivatives of the above mentioned).

In addition nitrification and denitrification may simultaneously be carried out by the Anammox process in which oxidation of ammonia is connected directly to denitrification. The organisms participating in these reactions of this process have not yet been elucidated.

In addition to the biological processes, numerous processes for separation of particulate material, such as mechanized particulate removal, sedimentation tanks, sand filters or centrifugation devices (like lamella separators, drum filters (e.g. Hydrotech®), swirl separators, triangle filters, or disc separators for particulate removal) may be used, Including bead filters, fluidised sand filters, this includes foaming and foam separating devices and skimmers, for removal of foam or surface related compounds, as fat-, carbohydrate- and protein-like substances.

Numerous air or molecular oxygen addition methods, addition of ozone, UV filtrations are employed for the optimization of water quality. Especially, UV-filtration and or ozone may be employed before release of mineral rich, but nutrient low or nutrient absent exchange water from the closed loop water body, for the sterilisation of the water before reaching an external recipient.

Water exchange, in combination with salt addition, may be used to set salt concentrations to preferred levels, which may include alkalinity controlling buffer salts.

Water may be heated by solar radiation. Temperatures may be set and controlled at any minimum temperature for different culturing requirements, by water exchange, ventilation heat exchangers, and any type of heat pump system or biogas.

Pumps may be driven by wind, sludge incinerationt or biogas generated electricity.

The following central themes of the sequenced bioreactor system is that the system makes use of denitrification before the BOD oxidation and nitrification processes, and that an increase of biological purification efficiency in many cases can be further increased by a multiple loop system. This makes possible:

1. Substantial conservation of organic carbon for denitrification.
2. Reduction of organic materials before the nitrification process that in turn increases the nitrification efficiency.
3. The increase of concentration of ammonium, nitrate, BOD and phosphate in any reactor loops for increase of biological purification efficiency, with the combination of at least one internal loop systems within the water purification.
4. Decrease of water flow during the purification process, which in turn increases biological purification efficiency, since the hydraulic retention time can be increased.
5. Repeated recirculation of waste water within the loop or bioreactor, thus increasing the purification efficiency by repeated exposure to the microorganisms in the purification reactor, is made possible by internal by-pass-systems in the loop systems or bioreactors.

Thus the basic considerations are that purification operations and by-pass flow combinations are such that concentrations in the water are maximized in one or more loops which then increases purification yields in the reactors. Concentrations in mentioned loops may be maximized up to bet well below the tolerances of $LC_{50}$-values (lethal concentration where 50% mortal rate is executed) for the aquaculture organism cultured, which produce the main following waste constituents: $NH_4^+/NH_3$, $NO_2^-$, $PO_4^{3-}$, their inorganically bound analogues and BOD and TSS in general.

DETAILED DESCRIPTION OF THE INVENTION

The basic aspect of the invention is the use of internally produced organic material or BOD from the production unit for the denitrification and phosphorous accumulation in a bioreactor system, preferably comprising a suspended carrier system and or activated sludge reactors, respectively. This basic aspect leads to the reduction of organic materials, which lead to the increased efficiency of nitrification. The process involves the following basic and successive purification steps:

1. Oxygen reduction by internal use of BOD or by BOD addition.
2. The reduction of nitrite and nitrate by denitrification to atmospheric molecular nitrogen.
3. Oxidation of organic material or BOD for reduction of organic waste in the water.
4. Autotrophic oxidation of ammonium-nitrogen to nitrate.
5. Biological phosphorous elimination with PAO's.
6. The water is recirculated back to the agro-/industrial production unit.
7. Finally the oxidised nitrate-nitrogen is returned to the denitrification reactor for final reduction to molecular $N_2$-nitrogen after one cycle through the aquaculture tanks.

The invention will be described in detail with reference to FIG. 2, which shows one embodiment of the invention. In all the figures the same numerals are applied, 10 denotes one or multiples of industrial production units or production units for agri- and aquaculture in multiples of culturing tanks or vessels, wherein the fish, shellfish or crustaceans or other organisms to be cultured develop, grow and is fed; arrowed lines drawn in full black are connecting the different bioreactors of the system for water purification; dot-dashed lines indicate particulate organic material transport separated from the water flow; dotted lines indicate optional loops for transport of fermentation products following the biological processes; dashed lines indicate system pathways in use during water exchange, i.e. loop RN and loop RP. Arrows at the lines indicate the direction of the flow of water or mass transfers.

Figure 1:
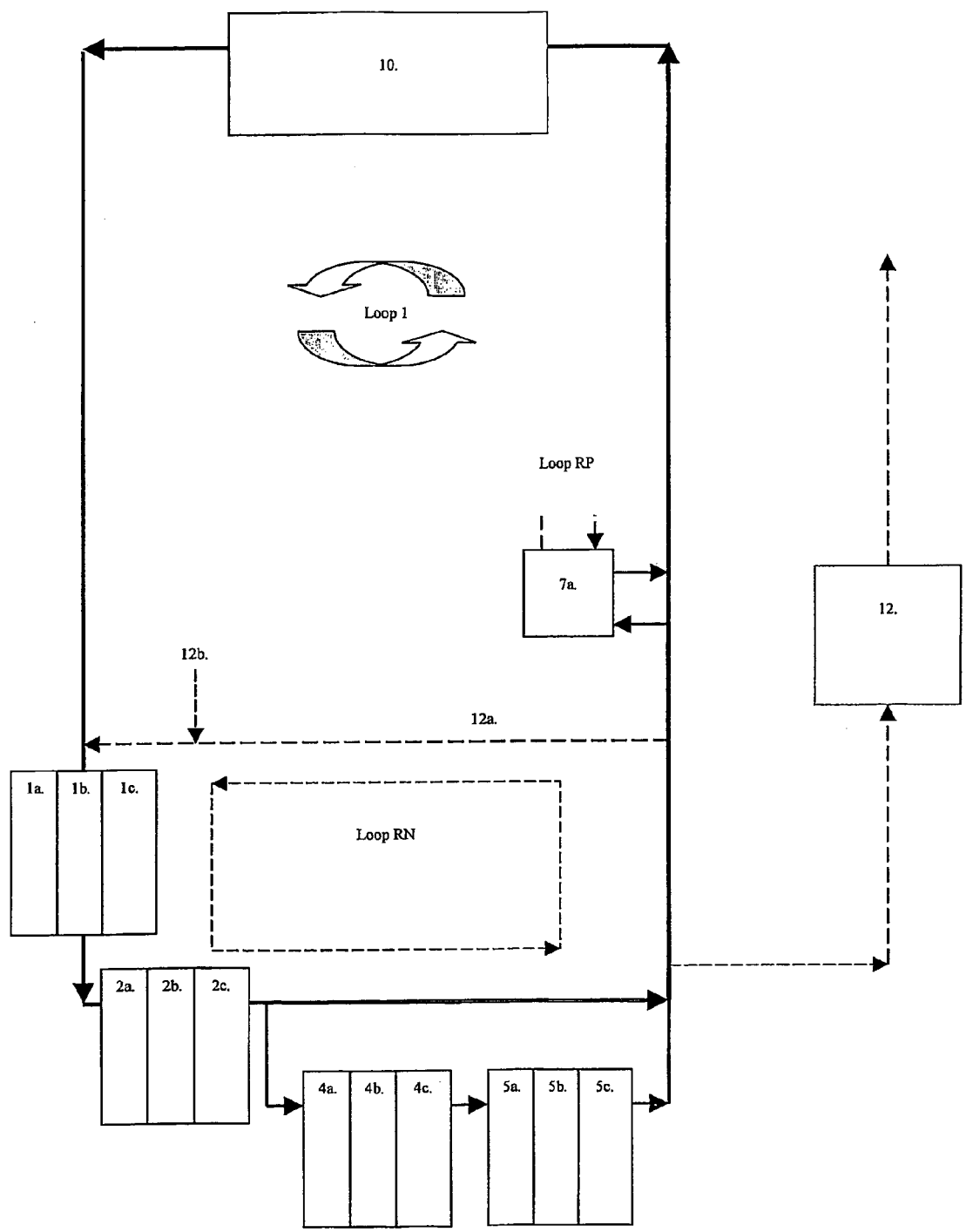
FIG. 1 represents a basic embodiment of the invention.

In FIG. 1 A Basic Embodiment pf the Invention is Outlined

In general terms the waste water flow from the production unit 10. The first net purification process starts with reactor 1, which is an oxygen consumption reactor in loop 1, reducing oxygen concentration levels to a minimum. The water then reaches a denitrification reactor 2 to produce gaseous nitrogen ($N_2$) from any nitrite and nitrate in the water. After denitrification water is divided in a by-pass to form loop 2, where BOD oxidation takes place in reactor 4 before nitrification in bioreactor 5. Thus, loop 2 separates the nitrification reactor from the rest of the water system and represents a highly specialized water environment with low organic levels favouring autotrophic growth; largely differing from the effluent waste water produced from the production vessels 10, the denitrification vessel 2 and thus positioning nitrification as far away as possible from the mainstream water flow. After nitrification, phosphorous, when obtained in a concentration suitable for phosphorous removal, is removed in a bioreactor 7, before water is redirected back to the production unit 10. A loop RN is a recirculation loop for nitrogen (N) purification and water exchange preparation, running through by-pass system 12a, before water to the water exchange tank 12 is discarded from the system. Water refill to the system is made by valve 12b. The loop RP represents a recirculation loop for repeated phosphorous treatments in reactor 7.

Figure 2:
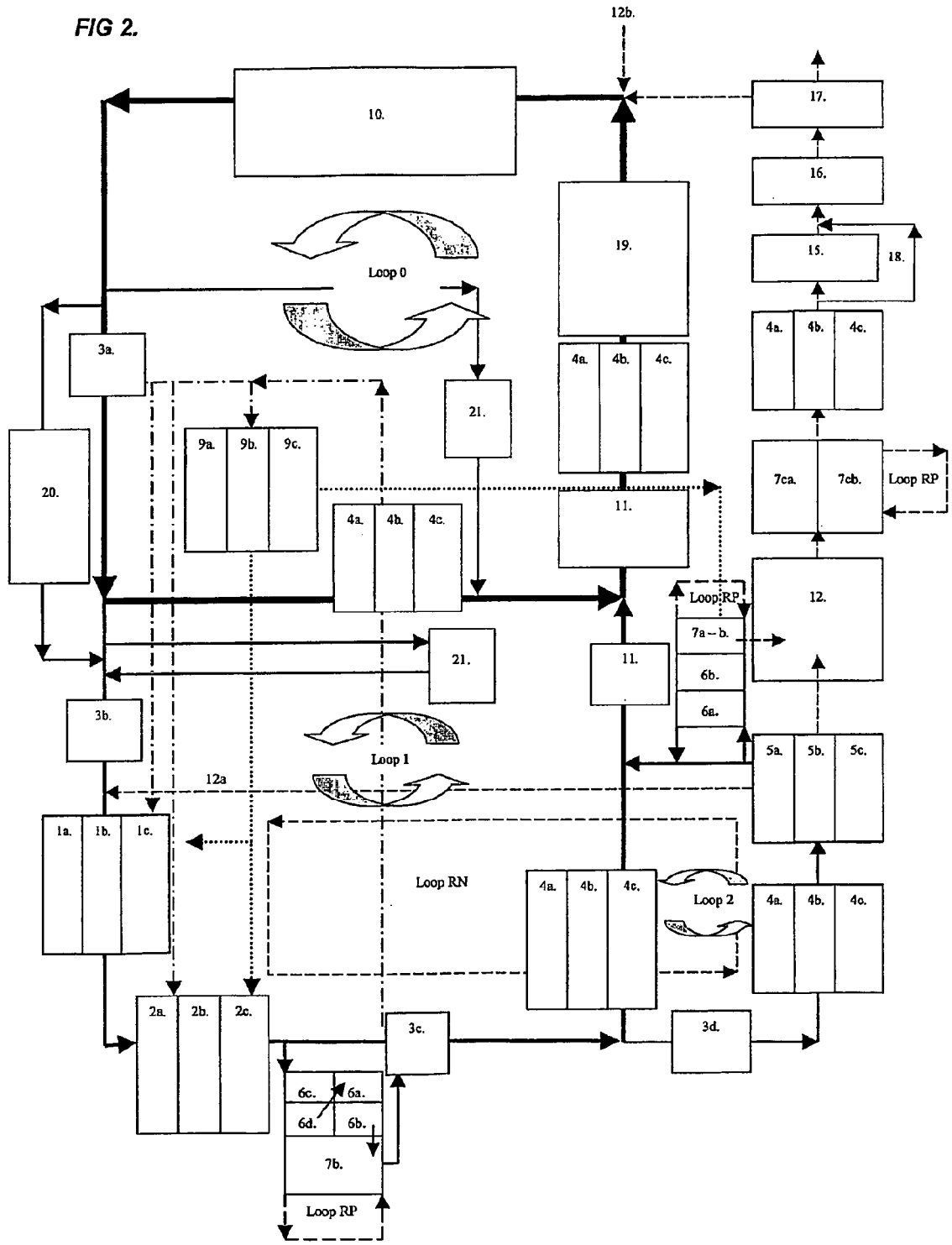
FIG. 2 represents a schematic view of a bioreactor sequence in detail.
Figure 3:
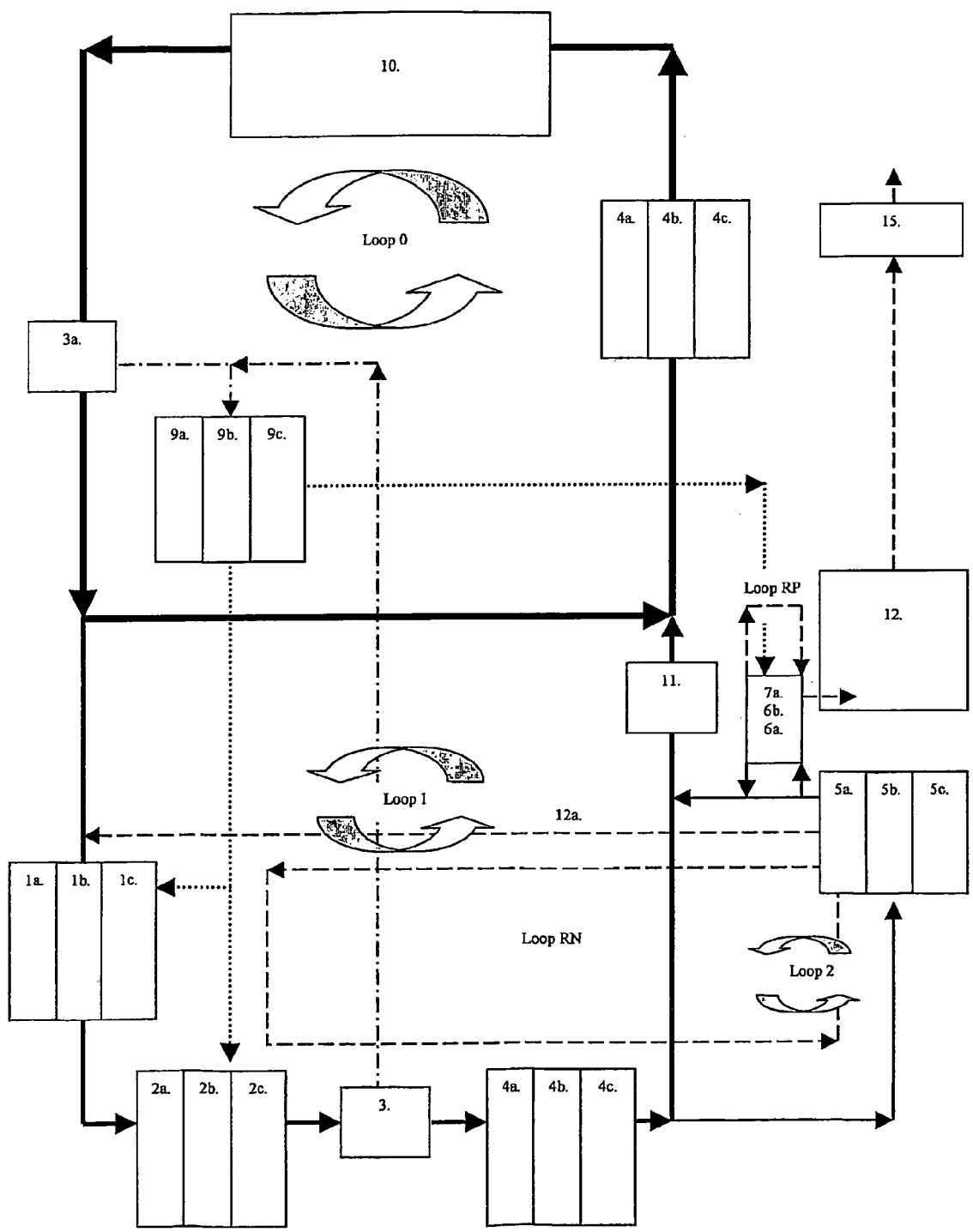
FIG. 3 represents a schematic view of one embodiment of a bioreactor sequence of the invention, and Serial and successive compartments of the bioreactor in question will increase the efficiency of each bioreactor in the system in many cases. Thus, in most cases, the bioreactors are designated a, b, c, and so forth, for each successive compartment in the same biological reactor process. This compartmentalisation is an arrangement that is tailor-made according to the above-mentioned amount and balance of nutrients and carbon produced by the specific type of agro-/industrial system in mind. The compartmentalisation of any one specific bioreactor in the system may be made within one or by arrangement of several successive separate tanks.

In FIG. 2 A Further Detailed Embodiment of the Invention is Outlined

In general terms the waste water flow from the production unit 10 first passes one or more reactors 3, wherein particulate material is removed and/or foaming devices and/or skimmers are applied, for removal of foam or surface related compounds, before it enters a reactor 1, which may be divided into more compartments or consist of more reactors 1a–1c, etc. Prior to reactor 1 a by-pass separates a loop 0 from loop 1. In loop 0, no processing of nitrogen or phosphorous is made, hence the designation of "loop 0", and water is recirculated back to the production unit 10 with minor water quality adjustments made to fit basic requirements for the production unit, such as BOD oxidation in reactors 4, which may be executed in different positions in loop 0. The first net purification process starts with reactor 1 in loop 1, which is an oxygen consumption reactor, reducing oxygen concentration levels to a minimum. The water then reaches a denitrification reactor 2, 2a–c, etc, to produce gaseous nitrogen ($N_2$) from any nitrite and nitrate in the water. Further particulate separation ensues in reactor 3, before it reaches a BOD oxidation reactor 4, 4a–4c, etc, in loop 1 whereby reactors 1, 2, 3 and 4 together with a reactor 11 form loop 1. Reactor 11, may be positioned in several positions and represents a gas-stripping reactor, primarily eliminating $CO_2$, in the water that is directed back to the production unit 10. A by-pass separates water in loop 1 from a third loop: loop 2, which contains the nitrification reactor 5, where nitrification takes place (i.e. wherein ammonia and nitrite are oxidised to nitrate), and a BOD eliminating reactor 4 prior to the nitrification reactor 5. Thus, loop 2 separates the nitrification reactor from the rest of the water system and represents a highly specialized water environment. After nitrification, phosphorous, when obtained in a concentration suitable for phosphorous removal, is removed in a bioreactor 7a, before water is recirculated to the production unit 10. As is later explained nitrification 5 and denitrification 6 b precede the biological phosphorous removal reactor containing the PAO. A loop RN is a recirculation loop for nitrogen (N) purification and water exchange preparation, running through by-pass system 12a, before water to the water exchange tank 12 is discarded. A loop RP represents a recirculation loop for repeated phosphorous treatments in reactor 7.

The detailed descriptions of the processes are described as follows In FIG. 2. Before the first biological purification step of the waste water funnelled from the production unit(-s) 10, particle removal devices in the form of screen, swirl separator, sand filter, drum filter, sedimentation tank or any device for particulate removal 3, including bead filters, fluidised sand filters, including foaming and foam separating devices and skimmers, for removal of foam or surface related compounds, as fats-, carbohydrate- and protein-like-substances, separate organic material from the water. Particle removal devices 3 may also be placed directly in the culture tanks in the form of a sediment trap, lamella or screen type separator. The particulate separation in this purification step ranges between approximately 10 to <100% of suspended solids, depending on the type of separation process, energy input and screen mesh. Screen mesh range is in the area around 10–500 µm, typically between 20–140 µm, particularly 60 µm (±20 µm). Lamella separators, if used, are applied at the sedimentation velocity range of 0.1–5 m/h and with an inclination of the lamellas in the range of 10–80°, particularly 45° (±15°). Size of sand particles in the sand filter range from 100–0,1 mm, particularly 1–10 mm, and may be of any naturally occurring mineral composition, sand or gravel, including alkaline sediments, and may act as a buffering component for the water system. As noted in the detailed outline, particle separation devices 3 may be placed in several places in loop 0, 1 and 2. An example of the placements of particle removing devices 3b and 3c is that water flow in these positions is reduced compared to the prior position of device 3a. A particularly advantageous position 3c is accomplished since this position removes excess particles before "burning off" of BOD in reactor 4, leading to sufficient reduction in BOD levels in loop 2 where nitrification ensues, the latter demanding low BOD levels for high efficiency. One possible position for the reactor is in position 3d, which may be executed if e.g. the BOD oxidation reactor 4 in loop 1 is substituted with BOD oxidation reactor 4 in loop 0.

The separated particulate organic material from devices 3 is stored and fermented in a fermentation reactor 9, or in part or directly transported into a denitrification reactor 2 via the dot-dashed route (not all connections are drawn) and/or an oxygen consumption reactor 1. The fermenting reactor has organic or sediment turn over rates of 5–30 days, typically 10–25 days, particularly 15 days (±3 days) of organic sludge age. The pH levels are to be run between 5 and 8.

Synthetic or otherwise enriched or biologically produced obtainable organic material may be added as a biological energy source via the fermentation reactor 9 or directly into any reactor via the dotted or dot-dashed route and may be of any carbon compound earlier described, particularly to the oxygen consumption reactor 1 or 6a, and denitrification reactor 2 or 6b.

In the first biological step, in an oxygen consumption reactor 1, oxygen in the incoming water from the culture tanks 10, via the particle separation units 3, is removed either by degassing with nitrogen, or another inert gas, or by addition of a carbon source with con-comitant microbial oxygen consumption. The reduction of oxygen to lower threshold levels for the production of microbial anaerobic/anoxic conditions is especially necessary for the induction of denitrification, but also for phosphorous removal in a later step 7a, b or c. Reactor 1 may make use of especially fast respiring micro organisms (e.g. *Azotobacter* or other metabolically or genetically related species in multiple organism communities involving both fungi and bacteria). General rates of oxygen consumption range between 1–50 mg $O_2/m^2$ h, depending oxygen saturation levels, the quality of the organic material and biofilm thickness. Common oxygen consumption rates may lie in the range of 1–10, or even as narrow as 2–7 mg $O_2/m^2$ h.

Nitrogenous gases may be diverted directly from the anoxic bioreactor 2 to the reactor 1 for oxygen degassing of incoming water to reactors 1 and 2.

In the second step, denitrification removes nitrate and nitrite from the water body in an anoxic bioreactor 2, by its final biological reduction to inert molecular $N_2$-nitrogen that is released to the atmosphere. Of special importance is the control of the C/N ratio in the incoming water to the bioreactor, so as to provide it with enough carbon for the present nitrate to be reduced. The approximate range of carbon utilisation in this process lies in the range of 1–10 kg organic material (with these figures defined in the form of BOD or COD) per kg of reduced nitrate-nitrogen. For instance, the reduction of nitrate with methanol requires around 1.9 kg of methanol per kg of reduced nitrogen-nitrate. The use of acetic acid for denitrification will require 2.67 kg of the substance per kg of nitrogen-nitrate reduced. Redefining methanol and acetic acid as BOD, will require 2.87 and 2.85 kg of methanol and acetic acid respectively, calculated as BOD. However, these are examples of high-grade carbon substrates, not readily available in excessive amounts in aquaculture water, and more importantly, expensive. Thus using low grade carbon resources as fermented sludge, molasses or silage liquor or the like, may require higher levels of carbon source due to higher conversion ratios, and may reach far above the 3 kg BOD level, or even 5 kg and above, for the reduction of one kg of nitrogen-nitrate. Denitrification is an obligate anaerobic process and the threshold levels of oxygen for enzymatic activity lie in the area of 0.2–0.3 µg $O_2/l$. Such low levels are desirable, but not always imperative for denitrification systems In practice. This is due to the fact that the oxygen content in the water body may be significantly higher than in the biofilm. The biofilm may still provide for anoxic or anaerobic conditions at far higher bulk concentrations of oxygen. In practice, denitrification may occur at reasonably high rates at bulk water concentrations as high as 0.5 mg $O_2/l$. Thus, the actual thickness of the biofilm in the denitrification reactor will be a significant determinant for the needed reduction of water oxygen concentrations in the water, to acquire desired levels of denitrification. The feeding of BOD to the preceding bioreactor 1 regulates these levels. General rates for denitrification range between 0.2 and 40 mg $N/m^2$ d, depending on the anaerobic completeness, the quality of the organic material and biofilm thickness. Common denitrification rates lie in the range of 0.5–5, particularly 1.5–3 mg $N/m^2$ d.

In the third step, particle separation devices 3 separate organic material from the water in device 3c, accordingly to the detailed description above. The organic material is redirected to the fermentation reactor 9, or directly to the oxygen consumption reactor 1 or the denitrification reactor 2. Thus, the total organic content in the water is lowered before an ammonia and nitrite oxidation ensues in bioreactor 5 in loop 2. This particulate carbon elimination may be an optional stage, depending on the overall quality of the water for purification, i.e. the balance between macronutrients and organic material in general. This device may be placed after or preferably before (3c) a BOD oxidizing reactor 4, in the next step in positions 3c or 3d.

In the fourth step, in reactor 4, the prime concern is the oxidation of dissolved organic material (BOD). In this reactor, high oxygen levels reduce BOD content by aerobic oxidation. When there are reasons to keep the levels of toxic nitrite at close to zero concentration none of the BOD oxidising reactors, except the ones in the nitrification stream, should be run to the onset of nitrification, nitrification being especially undesirable in loop 0, where it could produce toxic nitrite directly expelled into the production unit 10. The efficiency of nitrification in the following nitrification reactor 5 is directly connected to the BOD removal efficiency, nitrification being strongly limited by organic matter or BOD content in water. Since nitrifying microorganisms are autotrophic and slow growing, they will typically be out-competed by heterotrophic microorganisms at certain BOD levels. High levels of BOD lead to heterotrophs overgrowing the autotrophic nitrifying bacteria, which reduces substrate availability of both ammonium and oxygen for the nitrifying bacteria. BOD may be added to the foregoing bioreactors 1 and 2 but only in part consumed. Thus, BOD has to be oxidised before reaching the bioreactor for nitrification, for which purpose this BOD oxidising reactor 4 is installed. It is practically impossible to remove all available BOD. However, consumption of BOD has to be maximised in this part of the system before reaching the nitrification reactor. In a similar respect BOD consumption leads to the reduction of BOD levels in the water leading back from reactor 4 to the production unit 10 in the by-pass loop 1 and 0. In overall consideration, the level of BOD concentration where nitrification becomes limited is very variable biodegradability, oxygen concentration and temperature. Typically at oxygen saturated water at high temperatures, e.g. at 28° C., BOD becomes limiting for nitrification as BOD levels rise above between 10 and 94 mg/l. At temperatures of 15–20° C. nitrification can be limited by a BOD concentration as low as 5 mg BOD/l in oxygen saturated water. An average value for BOD concentration limitation for nitrification at 20° C. lies around 20 mg BOD/l. Typically substandard environments develop where high diffusion rates of small carbon compounds (VOC's) are present, and negative factors impairing diffusion of oxygen prevail, like in low oxygen concentrations in the biofilm or thick biofilms. Such substandard conditions are common, not to say prevailing, in e.g. most agricultural or fish farming systems where effluent water is funnelled directly to the nitrification filter from the culture tanks. BOD consumption is effectively enhanced by bacteria with the high respiratory rates (e.g. *Azotobacter* or other metabolically or genetically related species) and multiple organism communities involving both fungi and bacteria, which then more readily compete for and consume the different fractions of carbon available as BOD in this step. Optimisation is made by addition of any source of oxygen in this part of the system. General rates of BOD oxidation range between 1–50 mg $BOD/m^2$ d, depending oxygen concentration in the bulk water, the quality of the organic material and biofilm thickness. Common oxygen consumption rates may lie in the range of 2–30, particularly 7–15 mg $BOD/m^2$ d.

The fifth step, which may be present in loop 1 or in loop 2, is the oxidation of ammonia to nitrite and further to nitrate in reactor 5. Since nitrite is very toxic to aquatic organisms, the nitrification process has to convert essentially all compounds that are oxidised into nitrite, completely to nitrate. However, complete nitrification is rare, even in supersaturated conditions, due to competition with heterotrophic bacteria and BOD residues. Optimisation is made by addition of any source of oxygen in this part of the system and by control of the retention time in the reactor. Blowing in air can make up oxygen addition, or oxygen enriched air, liquid oxygen injection, or concentrated oxygen gas (molecular oxygen, $O_2$), into the reactor to support the aerobic oxidation to nitrate. Oxygen and ammonium are generally the limiting substrates for nitrification, whereas BOD has an indirect inhibitory effect. However, at high ammonium levels, supersaturating the water with oxygen may also lead to limitation of $CO_2$ for autotrophic growth. This may occur especially at low pH levels, when access to $CO_2$ is very poor, due poor carbonate buffering system holding very little carbon dioxide in the system. Thus even if an ideal maximum kinetic nitrification level at 20° C. of around 100 mg $NH_4^+$-$N/m^2$ h or below (at maximum Michaelis-Menten kinetics), only requires around 1.2–1.4 mg $CO_2/m^2$ h, the water concentration of $CO_2$ is only around 0.6 mg/l in water (in equilibrium with the atmosphere), as e.g. is the case in all trickling filters. In normal cases in such a system, $CO_2$ concentrations are not limiting, due to excess $CO_2$ produced by heterotrophic bacteria. However, it can be demonstrated that at oxygen saturation levels in water at 20° C. (9.08 mg $O_2$/l), oxygen is limiting for nitrification if ammonium concentrations are above levels of 2.14 mg/l, which is a low level for ammonium. It can be demonstrated that at normal conditions in high rate aquaculture systems, where ammonium concentrations may well accumulate to the level of 10 mg/l, as in eel farms (concentrations of above 70 mg $NH_4^+$ have been verified during normal operation), indeed $CO_2$ is limiting for nitrification provided that oxygen is in excess by supersaturation. In general, under natural conditions in aquaculture systems, oxygen is normally the limiting factor. Thus, for maximum efficiency, i.e. providing enough $CO_2$ under supersaturated oxygen conditions, the preservation of $CO_2$ in reactors 1, 2, 3, 4 and 5 by avoiding gas stripping, de-airing and/or hermetically closing the reactors for loss of $CO_2$ is applied. In these cases an efficient way of injecting oxygen may be in liquid or gaseous phase of $O_2$. Hereby $CO_2$ can be preserved in the water phase without need for gas stripping, which then provides enough $CO_{2\ and\ O2}$, in supersaturated conditions. This variation of nitrification, especially when confined to loop 2, may be very cost efficient, since loop 2 has the lowest water flow in the system the addition of molecular oxygen may be used to create such conditions of supersaturated oxygen. This then requires a minimum amount of molecular oxygen addition to achieve super-saturation and above-standard nitrification rates. In oxygen supersaturated conditions, some nitrification rates have been found to exceed maximum ambient nitrification rates by a factor of 17. Further, and even more important in some cases, this arrangement allows the aquaculture system to be run at "low" pH levels of 5.5 to 6.5, or even lower, which reduces the content of ammonia to the advantage of higher ammonium concentrations. Thus, preservation of carbon dioxide together with high oxygen levels maintains the nitrification efficiency, even with poorly functioning carbonate systems at these pH values. General nitrification rates range between 1–100 mg $N/m^2$ h, depending oxygen saturation levels, ammonia concentrations, pH, BOD levels and biofilm thickness. In these cases biofilm thickness varies from 10–1000 $\mu$m, typically being 50–500 $\mu$m thick, specifically around 200 $\mu$m (±100 $\mu$m). Common nitrification rates in non-saturated environments with negative influence of BOD may lie in the range of 0.2–6, particularly 2–4 mg $N/m^2$ h. However, depending on the optimisation of nitrification levels the rates may increase by 10 to 20-fold in conditions with supersaturated $O_2$— and $CO_2$-gas levels.

After nitrification in reactor 5, water is either funnelled back to the production vessels 10, together with denitrified water from loop 1, or it is partly treated for biological phosphorous removal in reactor 6 and 7.

On the way back from loop 1 and 2, water may undergo additional treatments. Water from loop 1 and 0 typically contains high levels of carbon dioxide ($CO_2$) and may have to be stripped from gases produced in the previous reactors 1, 2, 3 and 4. This is done in a gas-stripping unit 11, which may be placed in loop 0 and/or loop 1. In addition, water coming directly from production vessel 10 may be heavily laden with $CO_2$ and BOD, thus a BOD oxidising reactor 4 may have to be inserted in the mainstream water flow in loop 0.

Alternatively, stripping of harmful gases may be unnecessary if a plant or algal production basin 19 or 20, containing macrophytes or algae reduce nutrient and $CO_2$ content for production of oxygen. Additionally, basin 21 may be an activated sludge basin for partial reduction of nutrients and the production of soil improver organic material, placed before or after the inlet of plant production unit 20, and before or after the particle separation unit 3a. The associated macrophytes in the plant production units may be of the genera of *Elodea, Egeria, Cabomba, Myriophyllum, Ceratophyllum, Eleocharis, Potamogeton, Limnophila,* or *Vallisneria, Ludwigia, Nasturtium, Hydrocotyle, Oenanthe* and genetically (genotypic) or functionally (phenotypic) related species. A large important group of water plants for such culture belong to the *Bryophyta* with taxonomic classes of *Hepaticae* and *Musci*, specifically of the genera *Fontinalls, Vesicularia* and *Sphagnum*. Among these species it has been shown that some species, e.g. *Myriophyllum*, produce up to 50 g dry weight m²/day. In natural stands its average biomass is usually in the range 500–700 g dry weight/m². In cultivation, with an artificial stem support, some of these species can attain a positive growth rate even at high densities, and a biomass corresponding to around 2000 g dry weight/m². Furthermore, it can be grown well in a broad range of nitrogen concentrations, its biomass production staying approximately the same through the range 20–140 mg/l of nitrogen In water, which are relevant levels for aquaculture waste production of nitrogen. Also coexistence assay results show that macrophytes of the genera of *Cabomba* and *Myriophyllum* have inhibitory effects; producing growth-inhibiting allelopathic compounds are continuously secreted to inhibit undesirable blue-green algae (e.g. *Microcystis aeruginosa, Anabaena flos-aquae,* or *Phormidium tenue*) undesirable in most water systems. Of special interest is the cultivation of the water surface plant duckweed and their genetically (genotypic) or functionally (phenotypic) related species of the genera of *Lemna, Spirodela, Wolffia* and *Wolffiella*, divided on at least 17 known species. Other such functionally related species are from the genera and families (in brackets) of *Eichhornia* (*Pontederiaceae*), *Pistia* (*Araceae*), *Salvinia* (*Salvinideae*), *Azolla* (*Azollaceae*) and *Victoria* (*Nymphaeaceae*). Some of these plants show unusually high productivity. Average weight increases of 2–20 g/m² d has been verified for *Lemna*. Doubling times in the range of 24 hr have been observed on many occasions, and a production rate of 64 g/g dry weight/week, or 73 tons/ha/yr. Analysis suggest that production is positively influenced by the concentration of organic compounds in the water, making ideal as a component for purification of water directly obtained from industrial systems with high BOD content. Ammonium concentration in the range of 20–60 mg/l $NH_4^+$-N has no negative effect on duckweed production. In pond for clarification around 20% percent of the pond these plants can remove influent nitrogen.

The sixth step is the by-pass arrangement and preparation step for biological phosphorous accumulation and removal in reactor 7. This mode of operation has the advantage of making possible the continuous water exchange by releasing water from 7a, 7ca or 7cb to the subsequent aerobic BOD oxidation tank 4, to be finally expelled. The PAO process is negatively influenced by the presence of nitrate and in additional need of short volatile organic carbon chains (VOC's). Thus, the phosphate accumulation process in reactor 7 is negatively influenced by denitrification because denitrification removes carbon necessary for phosphate accumulating organisms, PAO's. The presence of nitrate also inhibits polyphosphate storage. Thus, nitrate should be consumed before phosphate accumulation and denitrifying microorganisms and PAO's should not compete about the same carbon source. Also, in high temperatures, above 10° C., the presence of reduced nitrate compounds, as ammonium will develop a nitrifying activated sludge or biofilm. Thus, low levels both of nitrate and ammonium, together with high levels of VOC's should be present in the water to be treated by PAO's. For these reasons, one optional mode of operation is to install the phosphorous removal system after nitrification tank 5, as the PAO reactor 7a. The reason being that no ammonium, or only low levels of the substance, will be present after nitrification in reactor 5, hence only denitrification is needed for removal of the remaining nitrate. Oxygen reducing reactor 6a is thus used after reactor 5 and before PAO reactor 7a, to produce anaerobic/anoxic conditions before transfer to reactor 6b for denitrification. After transfer to the PAO reactor 7a, the first PAO cycle starts with the addition of fermentation products (VOC's), preferable from the fermentation reactor 9, for carbon accumulation in PAO. The second cycle for PAO's ensues when transfer is made to the aerobic PAO reactor 7b. Here, the biological purification process is finalized by the accumulation of phosphorous in the PAO by internal storage of phosphorous under aerobic conditions. (It is hereby noted that all the PAO reactor alternatives mentioned can be designed with or without both an aerobic or anaerobic compartment, illustrated only with examples 7ca and 7cb in FIG. 2.) In summary, for the operation of bioreactor 7a, two additional reactor steps, oxygen consumption 6a and denitrification 6b, are needed before the completion of the water purification process in the PAO reactor 7a, since the presence of the preceding nitrification reactor 5 in this step, already has reduced ammonium content in the water. If the PAO system is designed as an activated sludge system, recycling of the sludge is made through the RP-loop.

In contrast, installing the PAO by-pass system after the denitrification reactor 2 in loop 1, reactor 7b, would require four reactor steps before reaching the PAO reactor 7b, which are 6c and 6d respectively 6a and 6b. The reason for this is that the waste water, after the denitrification reactor 2, is an anaerobic, ammonium and BOD containing water. Thus, BOD oxidation (6c) must precede nitrification (6d) to nitrify for oxidation of ammonium after which an anaerobic deoxyfication reactor 6a, analogous to 1, needs to consume oxygen to produce anoxic conditions, and finally denitrification (6b) is needed for the final consumption of nitrate. The water is then free of/or containing very low levels of, ammonium and nitrate and is prepared for the PAO reactor 7b. But clearly, in this set-up costs may be doubled compared to set-up in reactor 7a, due to the need of additional arrangements for nitrogen removal, requiring approximately four reactors in contrast to two reactors in the previously mentioned reactor 7a.

An optional and best mode of operation with the PAO system, depending on tolerances for phosphorous by the species in aquaculture and constraints put on the system by the precipitation side effects of phosphorous, may be its set-up with a PAO reactor 7c. In this arrangement the PAO reactor will be arranged outside the recycle loop (loop RN), thus no phosphorous elimination is made in the standard recycling and purification of mainstream water in the aquaculture system. Thus, in this embodiment, harmless phosphorous will accumulate in the aquaculture system. In this case, the PAO system is only reducing phosphorous as water exchange is made in the aquaculture system as a whole. In reactor 7c the PAO reactor will receive its water via the water exchange tank 12, as water is moved out of the aquaculture system for exchange. However, this puts certain constraints on the PAO system. Water exchange must be made at least once every 48 hours, otherwise the PAO population biofilm or sludge in any of the reactors 7a–c, will decline in numbers in competition with other microorganisms, the other organisms then competing for other substrates available when phosphorous is reduced to low concentrations. Thus, prolonged sub-concentrations of phosphorous in reactor 7c will lead to the decline of PAO sludge or biofilm. Preferably water exchange is made every 6 hours, typically every 3–12 hours, the water exchange commences at the latest 12 hours after feeding, typically 3–12 hours, preferably 1–6 hours after the arrest of waste production, or after the arrest of waste production after feeding in agri- aquaculture systems. After this arrest of waste production after feeding, the reactor purification system in loop 1 and 2, will have lowered concentrations of nitrate and ammonia to below average concentrations in loop 0, 1 and 2, making water ideal for PAO treatment and release to an external recipient. However, before this is done, the loop RN (the nitrogen recycle loop) polishes off remaining waste products inherent in the reactor system-loop 1 and 2, particularly ammonium and nitrate, to a minimum before being expelled to the water exchange tank 12. As water is released to tank 12, the refill valve 12b, is opened to fill the system with fresh external water without mixing with the water being expelled. This mode of operation has the advantage of water exchange being made as the waste production has halted, thus as loop RN polishes off the water, preparing it for release to tank 12, loop 0 temporarily works as a closed system. However, the levels of waste in production unit in loop 0 will only accumulate slowly, since waste production peak or peak after feeding has been passed, and thus the temporarily closed loop RN can be run without hazards for the species in aquaculture. Alternatively when industrial production is haltered in the production unit 10. As nitrogen levels have been optimally lowered by recirculation through by-pass 12a, water is finally discarded to the water exchange tank 12, as simultaneously the water inlet 12b is opened for substitution of the discarded water. A last important feature in reactor 7a–c is a RP loop (the phosphorous recycle loop). This loop provides the possibility for internal recycling of water containing too high levels of phosphorous to be released to the environment or aquaculture system. In the RP loop, excess phosphorous is recycled back trough the PAO reactor for repeated treatments, for reduction to very low phosphorous levels, before release. Evidently, set-up using reactor 7c as the PAO unit, requires no additional "auxiliary" nitrification and denitrification reactors as in reactors 7a and 7b. Thus, this must be regarded as the most cost efficient and advanced solution for biological phosphorous elimination in aquaculture systems.

The subsequent reactor steps prepare the water for the "final clinical" quality, when required, before being expelled to the environment. An optional BOD-oxidizing reactor 4 at this level polishes off remaining BOD previously added for efficient PAO reactor treatment. Thus, reactor 4 lowers the BOD levels to very low levels, not higher than 10 mg/l, preferably 1–5 mg/l, typically lower than 1 mg BOD/l.

Reactor 15 designates UV-treatment equipment for the sterilization of the water, which alternatively or together with ozone may be added to the process in reactor 15, which in some cases may alleviate the need for the previous BOD reactor 4, since ozone reduces BOD in treated water. Ozone also sterilizes the water.

Next step represents the stage where the water has been purified from biologically active nutrients as nitrogen and phosphorous compounds, including BOD. Viruses, bacteria and parasites up to macro fauna and flora level (as nematodes and fungi), have been destroyed by the sterilization treatment 15. As a measure of security, after the function of-the sterilization units 15, which can be disrupted by electrical short-circuits or electrical failures, an autoclave 16 is administered. This autoclave is filled batch-wise as water exchange is made. If an electrical failure should occur, potential pathogens will be contained in this autoclave. The autoclave can be filled, even during electrical failures, with UV-filter or ozone inactive, and finally, as electricity is again available, the autoclave is run at least at 100° C. and a pressure of 1.01 kg/cm2, typically at 121° C. and a pressure of 1.1/cm2 kg for the complete sterilization of all organisms in that water. The water is now germ free.

Finally the water may be desalinised in reactor 17 for use as drinking water, expelled to the environment or, depending on climate, e g in arid areas, been flushed back into the aquaculture system for reuse.

Different forms of by-pass around bioreactors, pumps, electrical monitoring devices with sensors, UV-units, fermentation units, culturing tanks, sedimentation and screening units are applied for all units in the processing of water. In the drawing, only one example of a by-pass is given 18. But this by-pass system is applied around each and every bioreactor and particle separator for water processing and maintenance purposes.

The steering system of the production system is made by the Integrated Process Control System (IPCS), monitoring and controlling the aquaculture production and filtration bioreactors. Artificial intelligence software programs control the control loops in the steering system, using linear or dynamic programming models. The control system is design for direct operation via the Internet to control and monitor the production optimization and results, as well as modifying control parameters, according to specific culturing conditions.

In order to determine the purification needs, primarily, a number of computer simulations were run to establish data for the construction of a plant for culturing fish.

The accuracy of the culturing operations will improve as a number of culturing operations have taken place, as all data will be stored in data bank, which data are then considered at further operations, thereby improving growth, yield and feedstuff efficiency, as well as heat supplies, water losses and other parameters of interest.

Data from Simulations

This is an illustration of how water quality can be estimated with aid of the simulator, knowing biological parameters of the type of fish being cultivated and parameters regarding the food fed to the fish. The simulation considers a fictitious fish species in freshwater, since the actual species is of less importance since the biological purification processes function regardless of fish species.

The following parameters regarding fish, feed and water result in a specific water quality after simulating two months of operating.

| Fish | |
|---|---|
| Initial bodyweight | 10 g |
| Final weight | 3000 g |
| Production cycle | 6 months |
| Production | 420 kg/month |

| Feed | |
|---|---|
| Proteins | 44.0% |
| Fat | 24.0% |
| Carbon hydrates | 14.0% |
| Ash | 8.0% |
| Water | 10.0% |

| Water | |
|---|---|
| Temperature | 15° C. |
| Volume | 160 m$^3$ |
| Flow | 500 m$^3$/day |
| Water exchange | 0.4% |

Plant

The simulated plant consists of 14 fish tanks, 6 m$^3$ each, together with a biological waste water treatment stage.

The biological treatment stage consists of 3 anaerobic operating tanks each with a volume of 10 m$^3$ and four aerobically operating tanks, one of 7.5 m$^3$ and three of 10 m$^3$.

Moreover the biological treatment stage also consists of a particle trap in form of a sand filter.

Running the simulator with fish, feed and water specified as above results in the following water quality in the fish tanks, with respect to 16 key substances.

| Water quality after operating one month. | | | |
|---|---|---|---|
| Notation | Description | | Unit |
| $S_I$ | Inert soluble organic material | 44.0 | gCOD/m$^3$ |
| $S_S$ | Readily biodegradable substrate | 5.35 | gCOD/m$^3$ |
| $X_I$ | Inert particulate organic material | 0.43 | gCOD/m$^3$ |
| $X_S$ | Slowly biodegradable substrate | 2.38 | gCOD/m$^3$ |
| $X_{BH}$ | Active heterotrophic biomass | 3.34 | gCOD/m$^3$ |
| $X_{BA}$ | Active autotrophic biomass | 5.74e−04 | gCOD/m$^3$ |
| $X_P$ | Particulate products from biomass decay | 1.24 | gCOD/m$^3$ |
| $S_O$ | Dissolved oxygen | 4.97 | gO$_2$/m$^3$ |
| $S_{NO}$ | Nitrate and nitrite nitrogen | 1.34 | gN/m$^3$ |
| $S_{NH}$ | Ammonium and ammonia nitrogen | 2.15 | gN/m$^3$ |
| $S_{ND}$ | Soluble biodegradable organic nitrogen | 1.13 | gN/m$^3$ |
| $X_{ND}$ | Particulate biodegradable organic nitrogen | 0.49 | gN/m$^3$ |
| $S_{Alk}$ | Alkalinity (as HCO$_3$-equivalents) | 2.11 | Mole/m$^3$ |
| $S_{CO2}$ | Dissolved carbon dioxide | 8.42 | g/m$^3$ |
| $S_P$ | Phosphorus | — | — |
| TSS | Total solid substance | 5.78 | g/m$^3$ |

This is an illustration of how water quality can be estimated with the aid of the simulator, knowing biological parameters of the type of fish being cultivated and parameters regarding the food fed to the fish. The data and constants used in the system are retrieved from scientific papers, produced from some of the leading scientist in water science and technology, as may be seen from the reference list.

The invention claimed is:

1. An integrated, partially or wholly closed loop system for waste water treatment, where the water contains nitrogen containing compounds and/or substances, at least one production unit of such nitrogen containing compounds and/or substances and using continuous bioreactor technology for the biological treatment and removal of organic matter, nitrogen and phosphorous from the said water at continuous flow, comprising: a) at least one suspended carrier bioreactor for bacterial growth under anoxic conditions to cause anaerobic denitrification, with one or several compartments, preceding b) at least one suspended-carrier bioreactor for bacterial growth under oxic conditions to cause aerobic nitrification, c) a denitrification taking place after the production unit, and d) a nitrification taking place prior to the production unit in a by-pass mode as part of the continuous flow.

2. A closed system in accordance with claim 1, wherein it is completely or partially closed with partial purification of a water body, and partial water exchange with the surrounding environment.

3. A closed system according to claim 1, for feeding water to plants or algae for consumption of sulphur, nitrogen and phosphorous as wall as mineral salts by aquatic plants and algae.

4. A closed system according to claim 1, wherein it encompasses polishing of the water using aquatic plants consuming nitrogen and phosphorous prior to the purification steps, whereby cultivated plants which are used as feed for the species in the aquaculture or food for human use, and/or as an alternative the basins can be placed aquaculture.

5. A closed loop system according to claim 1, wherein biogas is arranged to be produced in the system by fermentation of waste material of the system.

6. A closed loop system according to claim 1, wherein oxygen is provided to the system by any type of additions, as air, molecular oxygen in gas phase or liquid phase for any of the aerobic reactors.

7. A closed loop system according to claim 1, wherein oxygen is removed from reactors by vacuum, biological respiration or by injecting an inert gas.

8. A closed loop system according to claim 1, wherein the system is built into a water conserving building, where ventilation systems recondensate evaporated water for energy and water conservation for preservation of water and energy in cold, tropical or arid areas.

9. A closed loop system according to claim 1, wherein energy is arranged to be preserved by use of biogas produced in the system or any other biological system in its surroundings based on waste products of the system.

10. A closed loop system according to claim 1, wherein heat is arranged to be added by heat pumps, solar radiation, thermal fissures or by external biogas production.

11. A closed loop system according to claim 1, wherein by-pass systems are arranged around all the reactors and separator modules in the system to make possible differential purification processes and maintenance.

12. A closed system in accordance with claim 1, wherein it comprises an active sludge reactor to maximize production of aerobic activated sludge by aerobic production and consumption of an essential amount of nutrient salts and BOD before feeding water to remaining reactors.

13. A closed loop system according to claim 1, wherein a sterilization unit making use of UV and/or ozone is placed as the very last constituent of the system.

14. A closed loop system according to claim 1, wherein sterilization units making use of UV and/or ozone is placed anywhere in the system.

15. A closed loop system according to claim 1, wherein organic material is arranged to be recycled directly to the oxygen consumption reactor or to the denitrification reactor.

16. A closed loop system according to claim 1, wherein a sedimentation, tank for the final polish of water by chemical precipitation of phosphorous is placed between the system and a recipient.

17. A closed loop system according to claim 1, wherein a by-pass system is arranged to make possible the recycling of the water from the last stage of water purification after nitrification or biological phosphate removal, back to denitrification or up to any bioreactor in the purification.

18. A closed loop system according to claim 1, wherein the production unit is a production unit for industrial nitrogen containing water, food industry production unit, or culturing vessels for agriculture or aquaculture.

19. A closed loop system according to claims 1, wherein a screen, swirl separator, sand filter, drum filter, sedimentation tank or any device for particulate removal separates organic material, by skimming or foaming devices from the water is arranged in any position in the system.

20. A closed loop system according to claim 1, wherein part of the continuous flow is allowed to pass both the denitrification and the nitrification in a by-pass mode.

21. A closed loop system according to claim 1, wherein one or more oxygen consumption reactors precede the denitrification, arranged to generate anoxic conditions for denitrification.

22. A closed loop system according to claim 21, wherein organic material separated at the particulate removal system is arranged to be recycled directly to the oxygen consumption reactor, to a fermentation reactor or to the denitrification reactor.

23. A closed loop system according to claim 1, wherein one, or more particulate removal devices are arranged to generate partially or substantially particulate free water in different parts of the system.

24. A closed loop system according to claim 23, wherein the particulate removal device is selected from the group consisting of screens, swirl separators, sand filters, drum filters, sedimentation tanks, lamella separation filters.

25. A closed loop system according to claim 24, wherein foaming and foam separating devices and skimmers, for removal of foam or surface related compounds, as fats-, carbohydrate- and protein-like substances, and separate organic material from the water, are included.

26. A closed loop system according to claim 24, wherein a fermentation reactor is arranged to receive dissolved and particulate organic material from particle removal and foaming devices.

27. A closed loop system according to claim 26, wherein organic material is arranged to become fermented to fermentation products such as acetic acid or one to four carbon carboxylic acids, aldehyds, ketones, acetone or other compounds as carbon sources for the reactors, such as methanol, ethanol, glycerol, pyruvate.

28. A closed loop system according to claim 1, wherein one or more reactors for oxidation of BOD (biological oxidation demand) or organic material in the water are positioned in any favorable position.

29. A closed loop system according to claim 28, wherein $CO_2$ is preserved by introducing oxygen or pressurized air in a closed BOD oxidation reactor prior to nitrification.

30. A closed loop system according to claim 29, wherein the nitrification reactor is supersaturated with $CO_2$ by omitting air-and $CO_2$ stripping.

31. A closed loop system according to claim 1, wherein artificial intelligence software programs are arranged to for control loops in a steering system, using linear or dynamic programming models.

32. A closed loop system according to claim 31, wherein a control system is designed for direct operation via the Internet for control and monitoring production optimization and results, as well as modifying control parameters and turn over rates according to specific culturing conditions in every production plant of the here specified type.

33. A closed system according to claim 1, wherein it comprises a plant and/or algal production system being used in a green house or appropriate building in an upper, second level basin, where the depth of the basins is particularly 1 to 10 cm, but may be up to 1 m deep.

34. A closed system according to claim 33, wherein the basin will have a weight of 10 to 2000 $kg/m^2$, for the deeper applications, typically 2–300 $kg/m^2$.

35. A closed system according to claim 33, wherein it comprises plants or algal growth systems that filter off red and blue sunlight reducing algae growth in underlying aquaculture vessels.

36. A closed system according to claim 35 wherein it filters off red and blue wavelengths in the range of 420–600 nm and 650–720 nm, particularly absorbing light in the wavelengths of 420–550 and 670–720 nm.

37. A closed system in accordance with claim 33, wherein it comprises plastic films for coverage of the light transfer (transmittance) through the windows of the greenhouse.

38. A closed system according to claim 37, wherein it filters off red and blue wavelengths in the range of 420–600 nm and 650–720 nm, particularly absorbing light in the wavelengths of 420–550 and 670–720 nm.

39. A closed loop system according to claim 1, wherein the closed loop system further contains at least one biological phosphate removal bioreactor containing activated sludge or suspended carrier system, is applied in any position around previously mentioned reactors, in the continuous purification line or in a by-pass system.

40. A closed loop system according to claim 39, wherein the activated sludge for phosphorous removal is arranged to be recycled via a sedimentation chamber and phosphorous is arranged to be expelled by means of sludge.

41. A closed loop system according to claim 1, wherein the closed loop system further contains biological phosphate removal bioreactor placed after a denitrification and a nitrification reactor.

42. A closed loop system according to claim 41, wherein a by-pass system for a removal of phosphorous is arranged to use biological activated sludge or a suspended carrier system in multiples of anaerobic and aerobic compartment systems.

43. A closed loop system according to claim 41, wherein the activated sludge for phosphorous removal is arranged to be recycled via a sedimentation chamber and phosphorous is arranged to be expelled by means of sludge.

44. A closed loop system according to claim 43, wherein the denitrification reactor contains one or more reactors for oxygen consumption, providing anoxic conditions for the denitrification.

* * * * *